July 3, 1934.　　　　　　　G. J. ZIEGLER　　　　　　　1,964,779
TRACTOR
Filed Oct. 10, 1932　　　　　5 Sheets-Sheet 4

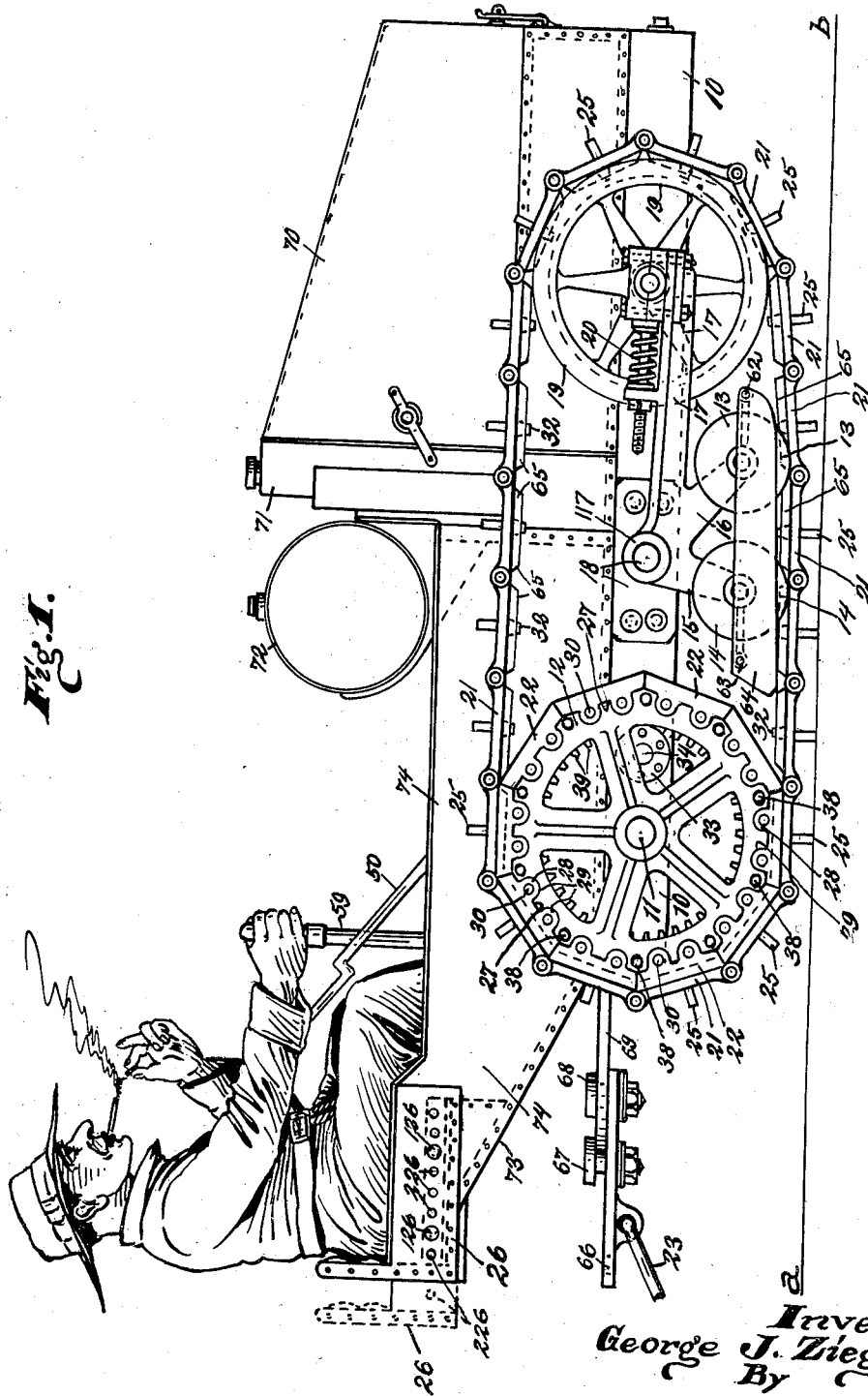

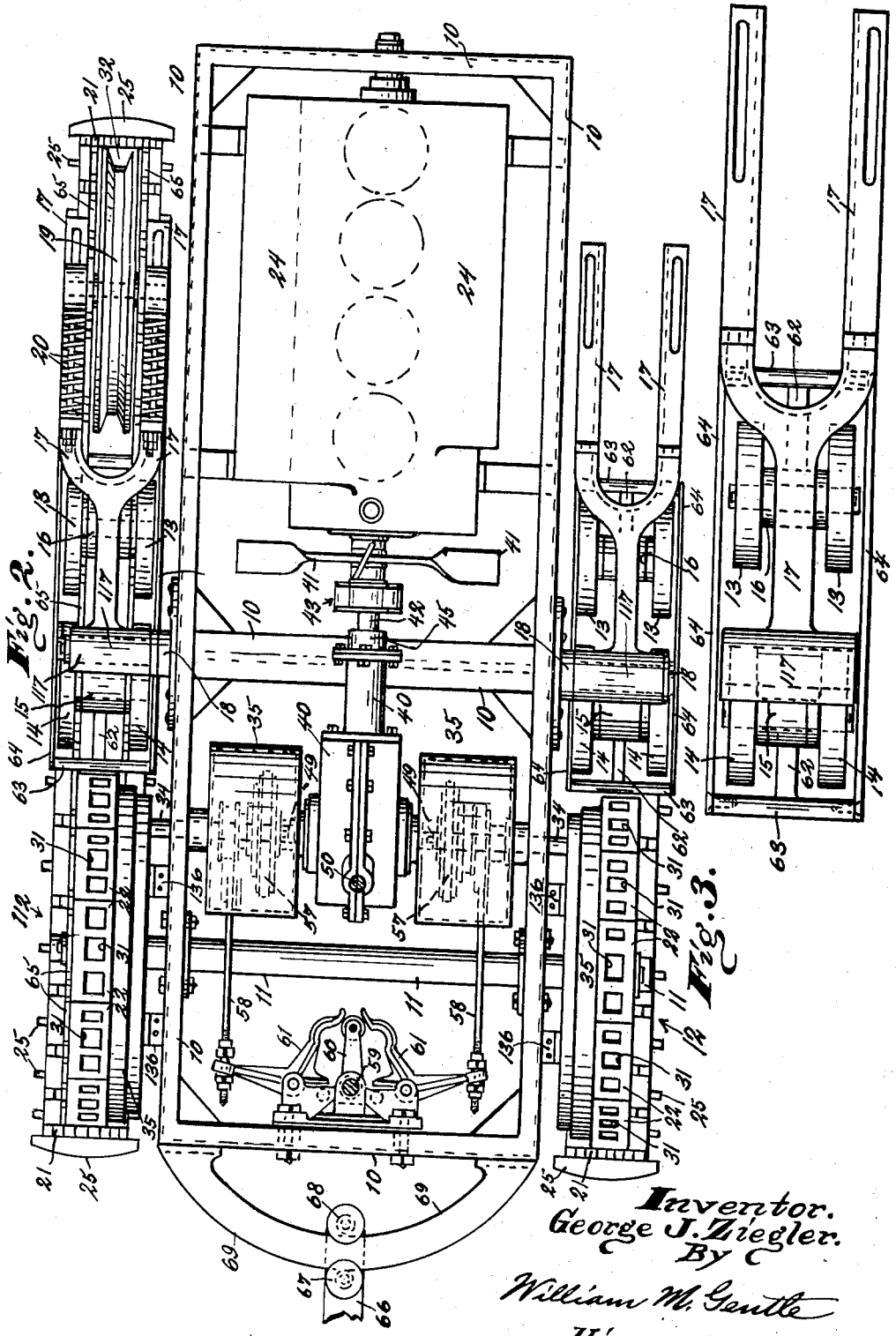

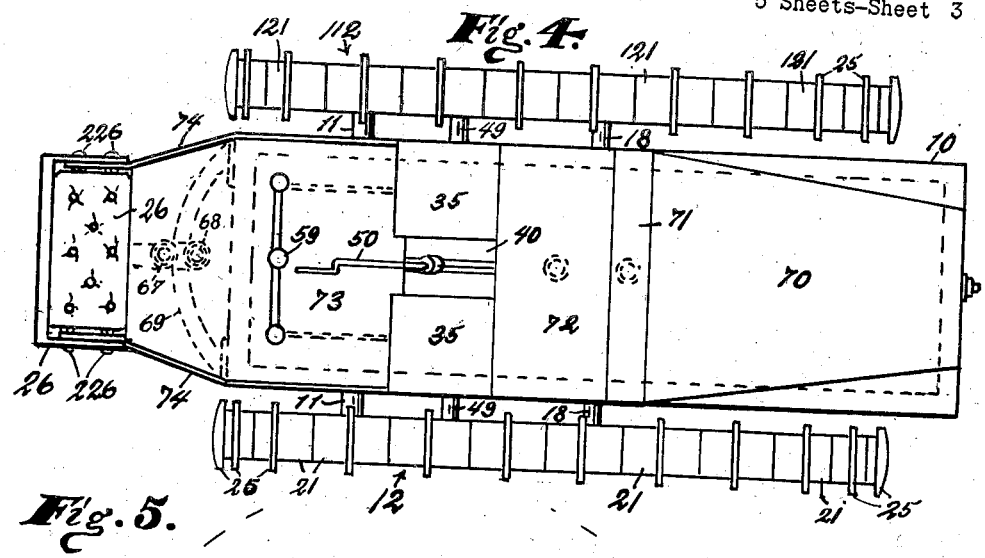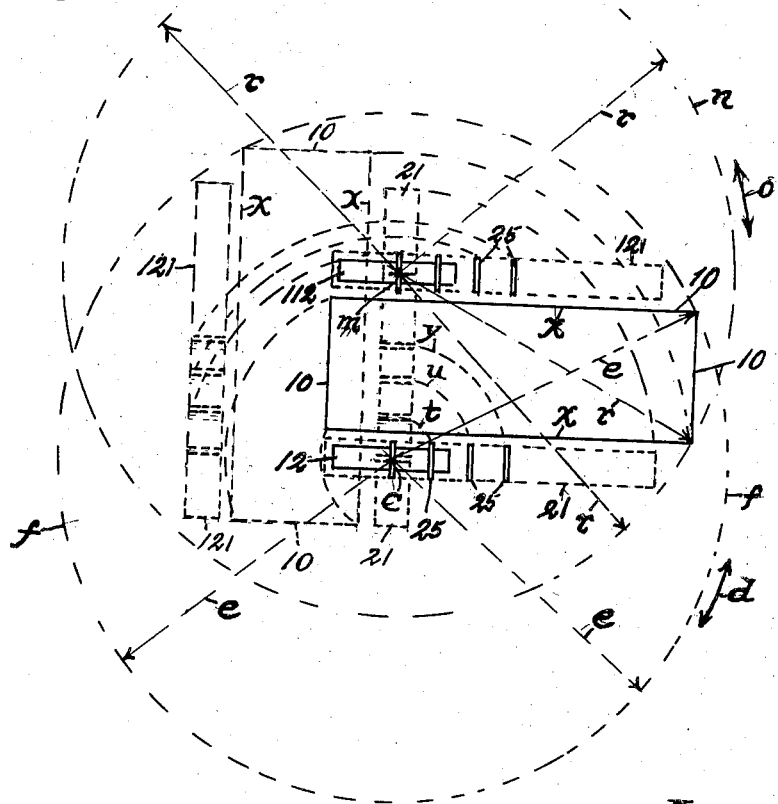

Inventor.
George J. Ziegler.
By William M. Gentle
His Attorney.

July 3, 1934.  G. J. ZIEGLER  1,964,779
TRACTOR
Filed Oct. 10, 1932  5 Sheets-Sheet 5
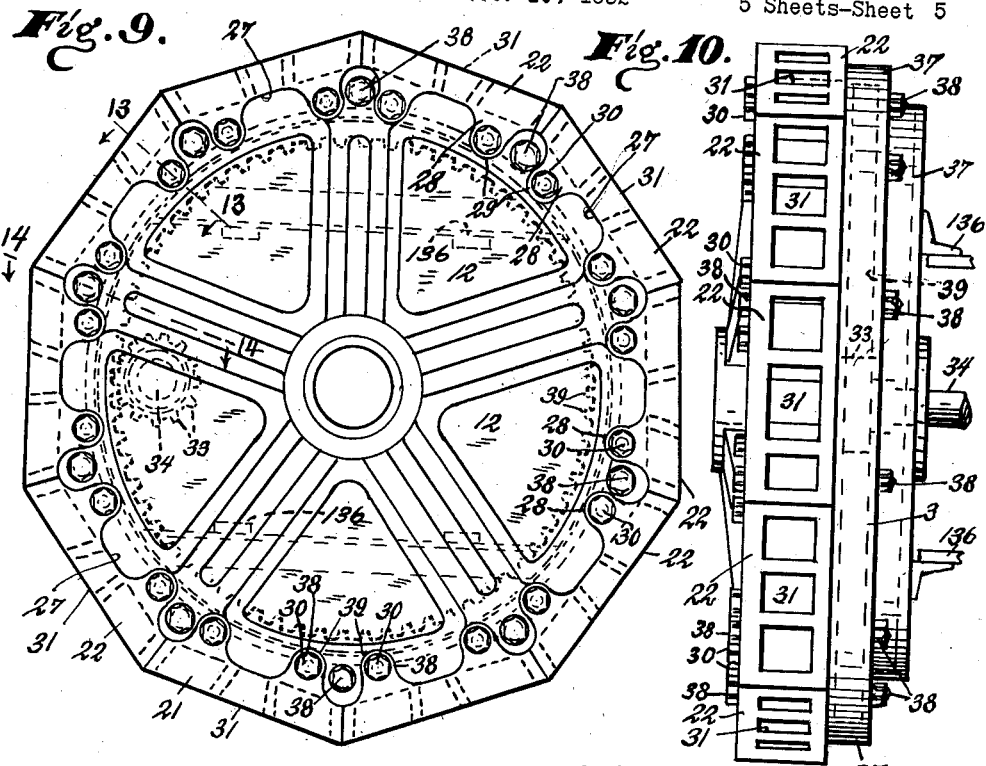
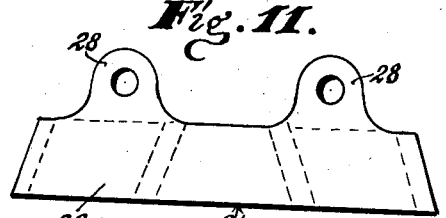
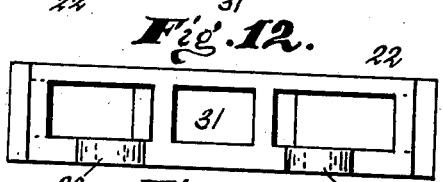
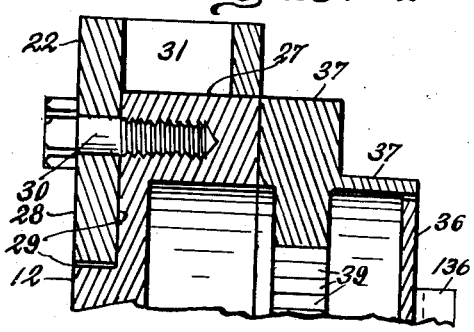
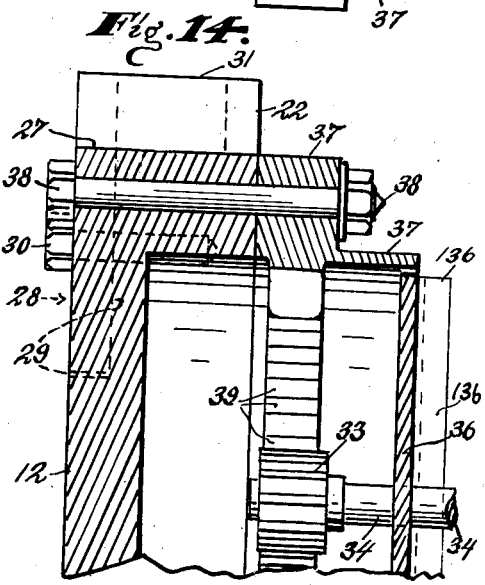
Inventor
George J. Ziegler.
By
William M. Gentle
His Attorney.

Patented July 3, 1934

1,964,779

UNITED STATES PATENT OFFICE 1,964,779

TRACTOR

George J. Ziegler, Los Angeles, Calif., assignor of one-half to Charles J. Heyler, Los Angeles, Calif.

Application October 10, 1932, Serial No. 637,051

6 Claims. (Cl. 180—9.1)

This invention relates to a tractor of the tread chain type and the principal object is to provide a tractor in which traction increases in a near corresponding ratio to the increase of pulling or retarding strain on the tractor draw bar. That is, the tractor is constructed so it normally travels on relatively short rearward portions of its parallel tread track chains with the forward end portions of the chains supported out of contact with the ground; and in this construction and arrangement of parts I provide means for laying down more of the track chains into tractional contact with the ground in a near proportion or ratio of traction to the pulley strain on the tractor draw bar. To that end I provide a relatively simple means for laying down under excessive strains nearly twice as much of the track chains as that on which the tractor normally travels.

The foregoing result is accomplished by constructing the tractor so that normally and under ordinary duty it travels on a relatively small rear portion of the track chains, the front end portions of the chains being carried in an elevated position out of contact with the ground, but when there is a heavy or excessive pull on the tractor draw bar such as to raise the front weighted and suspended end of the tractor frame, levers are automatically moved down to lay more of the track chains into frictional contact with the ground.

When the front end of the tractor frame is moved upward it also moves the spindles on which the rear ends of the carrier levers are mounted so that the weighted front ends thereof automatically move downward to cause more of the chains to come into tractional contact with the ground. In other words the suspended, weighted front end of the tractor frame and the means for causing more of the chains to come into tractional contact with the ground for traction purposes coact to prevent the tractor from somersaulting backwards when its draw bar is subjected to an excessive stopping strain or pull.

Another object of the invention is to provide a tractor that is especially designed to protect a driver from injury either by the tractor somersaulting backward or by the driver falling in front of any apparatus such as a mower or disk plow being drawn by the tractor. To that end I provide a rearward adjustable seat extension to the tractor that has a closed steel bottom and sides forming a compartment in which the driver can be safely seated with the extension arranged so it forms a stop to prevent the tractor from somersaulting backward when suddenly stopped by an excessive pull on its draw bar.

As is well known, such sudden stops of tractors as constructed heretofore, has caused them to often turn over backwards with fatal results and, as previously indicated, one of the objects of this invention is to provide a tractor in which such accidents are fully avoided by means of the suspended and weighted front end of the tractor frame and its rearward steel extension.

A feature of invention is shown in the construction, combination and arrangement of parts whereby the tractor is normally supported on the relatively short lengths of the track chains extending forwardly from the vertical center through the drive wheels to points slightly in advance of its center of gravity to thereby facilitate the short turning of the tractor.

In the accompanying drawings:

Figure 1 is a side elevation of a tractor constructed in accordance with this invention, showing a driver mounted on the adjustable safety seat and also showing the tractor normally traveling on four flanges of the track chain, it being understood that there is a track chain on each side of the tractor.

Fig. 2 is a fragmental plan view of the tractor with parts omitted, showing the general arrangement of the parts and also showing the front end of the tractor in a suspended position, the driving means being indicated semidiagrammatically.

Fig. 3 is a plan view of a rocking lever and associated parts that are arranged on opposite sides of the frame to support the tractor at points slightly in front of its center of gravity.

Fig. 4 is a diagrammatic plan view of the tractor.

Fig. 5 is a plan view of the tractor illustrating how it can be turned in either direction in an arc, the radius of which is of less length than the length of the tractor.

Fig. 9 is an outside view of one of the tractor drive wheels detached from the tractor illustrating how the ten shoes are detachably secured to the wheel and removable from the outside thereof.

Fig. 10 is a face view of the wheel shown in Fig. 9, showing the gear housing secured to the inside of the tractor wheel.

Fig. 11 is a side view of one of the tractor shoes detached from the wheel.

Fig. 12 is a plan view of the shoe shown in Fig. 11.

Fig. 13 is a fragmental section on the line 13—13 of Fig. 9, showing how the shoes are detachably secured by stud bolts in recesses on the outside of the wheel and with the tread surfaces of the shoes overlying the tread surface of the wheel.

Fig. 14 is a fragmental section on the line 14—14 of Fig. 9 showing how the gear casings are secured to the tractor drive wheel and also showing how disk shields are held supported in the flanged opening to the gear casings.

Figure 6:
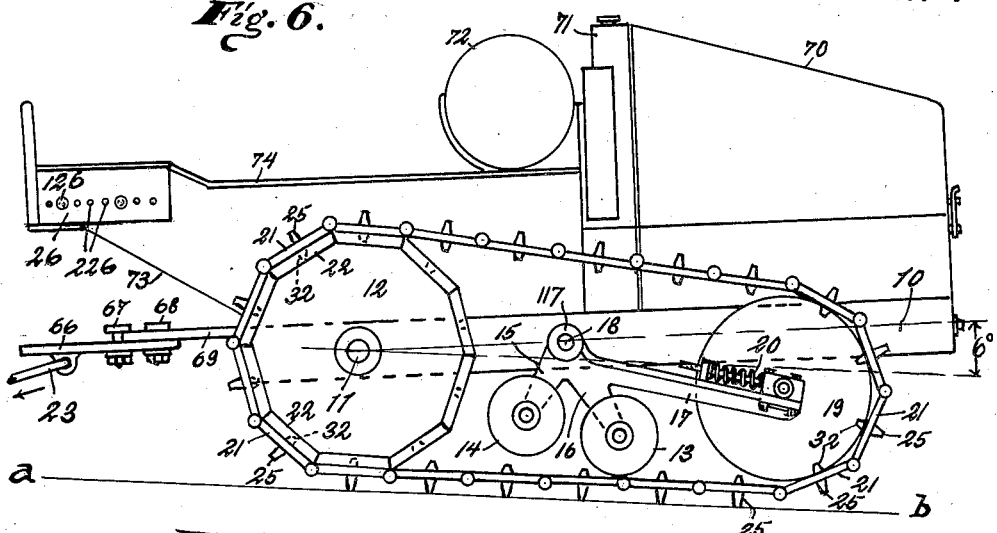
Fig. 6 is a diagrammatic side view of the tractor analogous to Fig. 1, illustrating how the suspended front ends of the track chains automatically move down to increase the traction of the tractor when its frame is tilted upward.

The tractor includes a rectangular frame 10 having its rear end supported by an axle 11 on which the drive wheels 12 and 112 are mounted and by which the tractor is driven. The front end of the frame 10 is supported in a suspended position by pairs of tread wheels 13 and 14 that are mounted on arms 15 and 16. The arms are integral with forwardly extending levers 17 that have their integral hubs 117 pivotally mounted on spindles 18 that are secured on opposite sides of the frame 10 at points slightly in advance of the center of gravity of the tractor. On the forward end of each lever 17 there is slidably mounted a carrier wheel 19 that is forced forward by pairs of springs 20 that are arranged to hold taut the endless track chains 21 and 121 that are arranged at the sides of the frame and extend over the drive, tread and carrier wheels.

Each of the drive wheels 12, 112 is provided with flat faced shoes 22, ten in number, over which the pairs of endless track chains 21, 121 are extended.

The pairs of tread wheels 13 and 14 support the levers 17 so they normally hold the carrier wheels 19 in position to carry the front end portions of the track chains 21 and 121 in suspended positions or out of contact with the ground. The top surface of the ground is indicated by the line a—b in Figs. 1, 6, 7 and 8.

As indicated in Fig. 1, the tractor normally travels on four of the links of each of the track chains 21, 121, means being provided for laying down more of the track shoes to increase tractional contact with the ground when there is an excessive pull on the tractor draw-bar 23.

The front end of the frame 10 is carried in a suspended position so that the weight of the engine 24 is applied on the spindles 18 to force the chains under the pairs of tread wheels 13, 14 into very heavy tractional contact with the ground. In other words, the weight of the suspended end of the tractor is divided between the pair of tread wheels 13 and 14 to increase the traction of the tractor with the largest part of the weight carried by the tread wheels 13 when there is a heavy pulling strain on the engine draw bar 23.

Figure 7:
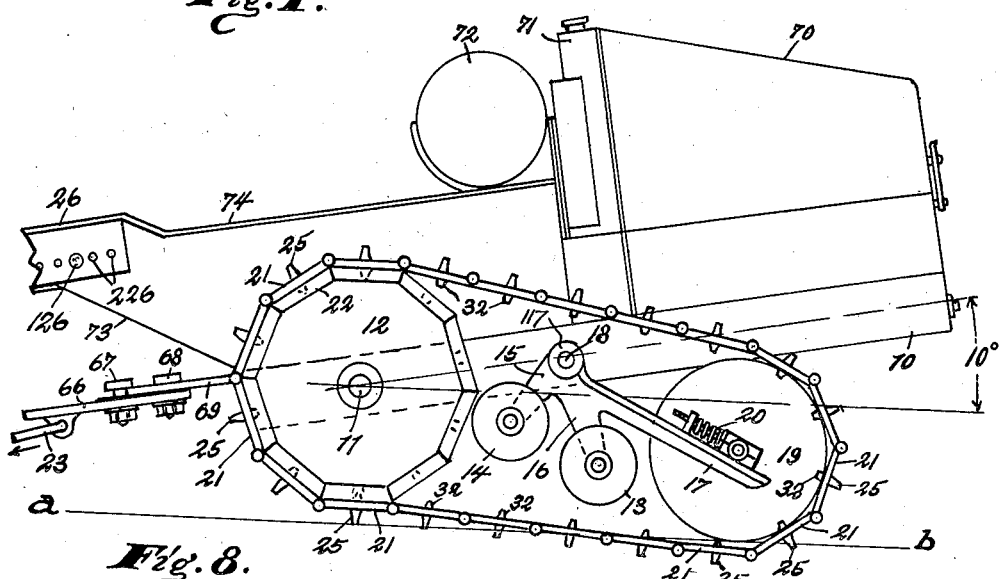
Fig. 7 is a view analogous to Fig. 6 showing more of the track chain in tractional contact with the ground and the front end of the frame tilted to a higher elevation, as by a pull on the tractor draw-bar.
Figure 8:
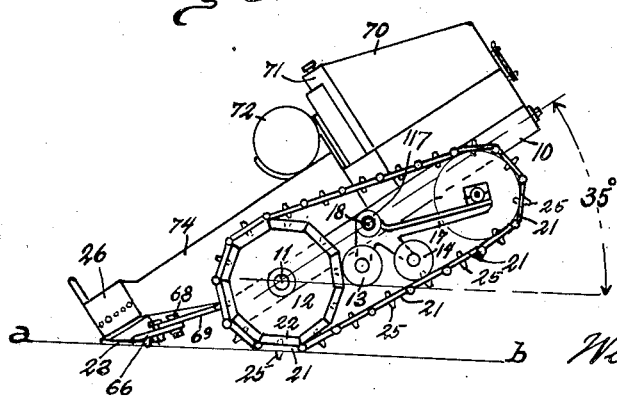
Fig. 8 is a view analogous to Fig. 6 on a much smaller scale showing the tractor frame tilted upwardly 35° and the safety seat in contact with the ground to prevent any further upward movement of the tractor.

Also the lever 17 and its associated parts are mounted on the spindles 18 so that when there is an excessive pull on the draw-bar 23 such as to tilt the frame 10 upward, as best illustrated in Figs. 6, 7 and 8, the weight of the carrier wheel 19 and associated parts moves downward to cause more of the track chains 21 and 121 to frictionally contact with the ground to thereby aid in resisting upward tilting of the frame. It is obvious that at such a time the weight of the engine will aid in resisting the upward tilting of the frame.

As seen in the drawings, each link of the endless track chains has transverse flanges 25, four of which, of each chain are in normal contact with the ground. That is, the tractor is normally supported on not more than about four of the links of each chain, or the portions extending from the center of the drive wheels to the center of the forward tread wheels, the forward end portions of the track chains being carried out of contact with the ground, as previously indicated.

The flanges 25 are arranged transversely to their respective links so they will enter the ground transversely to the travel of the tractor to increase the traction thereof and have their ends rounded like sled runners to facilitate the short turning of the tractor.

The increased traction of the tractor is further illustrated in Fig. 6, in which the frame is shown tilted upward about six degrees, which permits the levers 17 to move downwardly with their carrier wheel to cause more of the flanges 25 of the track chains 21, 121 to contact with the ground.

In Fig. 7 this action of the tilting frame and lever is further illustrated, it being assumed that the frame has been tilted upwardly ten degrees by a pull on the draw-bar 23 so as to lift both sets of the tread wheels 13 and 14 out of contact with the tread chains so the levers 17 will automatically move down by the weight of the chains and carrier wheels and engage the lower forward portion of the chains with the ground, as illustrated, thereby greatly increasing the traction of the tractor with the ground to resist the somersaulting movement thereof.

As illustrated in Fig. 8, a pull on the draw bar 66 that is sufficient to suddenly stop the forward movement of the tractor may cause its front end to tilt upwardly as much as thirty-five degrees where its somersaulting movement will be stopped by the steel seat 26 at the rear of the tractor contacting with the ground; and if, inadvertently, the tractor should be so tilted the rear tread wheels 13 will be moved by gravity into contact with their respective drive wheels 12, 112 and stop the downward arc movement of the levers 17 so that the tread chains and associated parts forward of the drive wheels will be lifted from the ground to add their weight to resisting the somersaulting movement of the tractor when suddenly stopped, as described.

In other words the weighted suspended front end of the frame and the rocking levers and associated parts coact to resist excessive upward tilting of the tractor; and the adjustable steel seat 26 acts as a positive stop to the somersaulting movement of the tractor in the event that the first mentioned means is ineffective to prevent the tractor from turning over backwards under excessive backward pulling strains.

The drive wheels 12 and 112 each includes a cast iron frame having ten flat peripheral surfaces 27 on which the tread shoes 22 are seated. These shoes have pairs of flanges 28 that are extended down into recesses 29 in the outside rim portions of the wheels, and they are detachably secured thereto by stud bolts 30, as best illustrated in Figs. 9 to 13, inclusive.

In other words the recesses 29 are arranged so that the shoes 22 can be placed on or detached from the wheel while all the other parts of the tractor remain assembled. That is, to remove or replace a shoe on a drive wheel only a pair of the stud bolts 30 need be removed and replaced to remove a shoe and replace it with another one. Each shoe has a tapered socket 31 that is adapted to receive the inwardly extending tooth 32 that is arranged centrally in each of the links of the track chains, by which means the track chains are driven when the drive wheels are rotated. The tooth 32 is integral with its respective link and is arranged opposite to the tread flange 25.

The drive wheels are rotated by pinions 33 on the transverse drive shafts 34 that extend outwardly from the clutch housings 35 through the disk mud-guards 36 into the gear housings 37 that are secured to the inside of the drive wheels by bolts 38. Integral with the gear housings 37 are internal gears 39 that are in mesh with the pinions 33. The disk mud-guards 36 are supported in the openings to the gear housings 37 by extensions 136 from the frame 10, as diagrammatically illustrated in the drawings.

The shafts 34 and their associated parts are constructed alike and both drive mechanisms are connected to the engine 24 through the reverse drive housing 40, as best illustrated in Fig. 2.

The engine 24 is diagrammatically illustrated in Fig. 2 and is shown with the usual fan 41 that is in driving connection with the engine shaft 42 by belt and pulleys 43. The shaft 42 can be connected to the drive mechanism in the housing 40 in the usual way as by a slip splined joint 45 diagrammatically shown in the drawings.

A transverse shaft 49 is shown by dotted lines in Fig. 2 as extending out on opposite sides of the housing 40 into the clutch housing 35 into engagement with the clutches 57. Also a crank arm 50 is provided for shifting the mechanism in the housing 40. The clutches 57 are set by draw bars 58 that are operated from a center steering post 59 through the lever 60 and bell cranks 61.

The detailed construction of this clutch mechanism and control is shown and described in detail in my copending application for United States Letters Patent on a clutch, Serial Number 361,998, filed May 10, 1929, now Patent No. 1,915,772 dated June 27, 1933.

These clutches are constructed and operated so that the drive wheels 12, 112 can be rotated together or independently of one another, and at different speeds to facilitate the guiding and turning of the tractor.

By a proper manipulation of the crank arm 50 and steering post 59 the tractor can be turned around in a circle having a radius that is less than the length of the tractor. Either drive wheel 12 or 112 can be used as a pivot on which the tractor can be turned, as illustrated in Fig. 5. When $c$ of the wheel 12 is the pivot on which the tractor is turned in either direction as indicated by the arrow $d$, the radius $e$ of the circle $f$ is less than the length of the tractor as indicated by the frame lines $x$. The same is true when $m$ of the wheel 112 is the pivot and the tractor is turned in the circle $n$ in either direction as indicated by the arrow $o$. The radius $r$ of the circle $n$ is less than the length of the tractor.

When the tractor is being turned in the circle $f$ the wheel 12 is held stationary relative to rotation but moves in an arc around the pivot $c$, at which time the tread chain 21 is also held stationary relative to rotation and moves around in an arc caused by the driving action of wheel 112 and its chain 121. That is when the wheel 112 and chain 121 are driven and the wheel 12 is held on the pivot $c$, the sled runner flanges 25 of chain 21 that normally support the right side of the tractor are caused to slide around in the arcs $t$—$u$— and $y$, as illustrated in Fig. 5.

It is obvious that when the wheel 112 is driven to effect the turning above described the flanges 25 of its chain 121 will change position and in addition to rotary movement they will move in varying arcs, as diagrammatically illustrated in Fig. 5.

It is also obvious that when $m$ is the pivot on which the tractor is turned that the flanges 25 of the chains 121 will be actuated in the same manner as the flanges of the chain 21, as above described.

The arms 15 and 16 of the rocking levers 17 have extensions 62 with transverse flanges 63 to which the mud-guards 64 are secured, as best shown in Fig. 3. The purpose of these guards is to keep the dirt from the track chains and tread wheels.

The links of the tread chains 21, 121 have longitudinally extending flanges 65 that are arranged to travel between the pairs of tread wheels to prevent the chains from slipping off the tread wheels when turning.

The tractor is provided with a draw bar 23 that is pivotally connected to a traveling plate 66 that can move in an arc to facilitate the turning of the tractor when pulling a gang-plow, disk harrow or like implement.

The plate 66 has guide rollers 67 and 68 that permit it to move in an arc on the curved bar 69 that is secured to the rear end of the frame 10, as best shown in Fig. 2.

The engine 24 is provided with the usual hood 70, radiator 71 and gas tank 72.

The seat 26 is adjustable by means of bolts 126 and a plurality of bolt holes 226 in the steel sides of the tractor.

As shown diagrammatically in Fig 4, the driving and steering mechanism is enclosed in proper housings and the frame provided with a steel floor 73 and side guards 74 so that the driver is fully protected when on the steel safety seat 26. It is obvious that he could not be injured by the driving mechanism or easily jarred off the seat when operating the tractor.

In operation the tractor is driven as fully described in the specification and is controlled by the crank arm 50 and steering post 59; and in the respect of increasing the tractional contact of the track chains as the pull on the draw bar increases the mechanism for accomplishing that result operates automatically.

What I claim as my invention is:

1. A tractor including a frame, a draw-bar connected thereto, drive wheels supporting the rear end of said frame, spindles secured to said frame slightly in advance of its center of gravity, rocking levers having their rear ends pivotally mounted on said spindles, tread wheels connected to said rocking levers that support the forward end portion of said frame in a suspended position, endless track chains on which said tread and drive wheels travel, an engine mounted on the suspended end of said frame so its weight is applied to resist the upward tilting of said frame when excessive pulling strains on said draw bar cause the front end of said frame to move upward, said levers arranged to move oppositely to the upward tilting of said frame to lay down more of said chains into tractional contact with the ground and to also resist the upward tilting movement of said frame.

2. A tractor including a frame, drive wheels supporting the rear end thereof, spindles secured to the sides of said frame slightly in advance of its center of gravity, rocking levers having their rear ends pivotally mounted on said spindles so they extend forward toward the front end of said frame, tread wheels connected to said rocking levers that support the forward end of said frame in a suspended position, carrier wheels at the front ends of said rocking levers, endless track chains on which said tread wheels, carrier and drive wheels travel, said rocking levers arranged to normally hold the front end portions of said track chains out of contact with the ground, an engine mounted on the suspended end of said main frame so its weight is applied to resist upward tilting of the front end of said frame, a driving connection between said engine and drive wheels, said rocking levers arranged so that when there is a pulling strain on the draw bar of said tractor such as to raise the front end of said frame and said tread wheels said rocking levers will move on their spindles to lower said carrier wheels and thereby lay down more of said endless track chains into tractional contact with the ground for the purpose of resisting the upward tilting of the front end of said frame.

3. A tractor including a frame, driving wheels mounted near the rear end of said frame, spindles secured to said frame, hubs pivotally mounted on said spindles, forwardly extending levers having their rear ends integral with said hubs, downwardly extending arms having their upper ends integral with said levers, pairs of tread wheels connected to the lower ends of said arms that are arranged to support the front end of said frame in a suspended position, an engine on the suspended end of said frame arranged so its weight will have a tendency to cause said tractor to nose downwardly, and a driving connection between said engine and drive wheels.

4. A tractor including a frame, drive wheels mounted on the rear end of said frame, spindles secured to the sides of said frame slightly in front of the center of gravity of said tractor, hubs pivotally mounted on said spindles, forwardly extending levers having their rear ends integral with said hubs, carrier wheels adjustably mounted on the forward ends of said levers, downwardly extending arms having their upper ends integral with said lever, pairs of tread wheels pivotally connected to said arms that are arranged to support the forward end of said frame in a suspended position, an engine arranged on the suspended end of said frame so its weight will have a tendency to cause said tractor to nose downward and apply the weight thereof to said tread and carrier wheels, a driving connection between said engine and drive wheels, and portable endless tread chains on which said tread and drive wheels travel.

5. A tractor including a frame, drive wheels mounted on the rear end of said frame, spindles secured to the sides of said frame slightly in front of the center of gravity of said tractor, rocking levers pivotally mounted on said spindles, pairs of tread wheels pivotally connected to arms on said rocking levers to support the forward end of said frame in a suspended position, an engine arranged on the suspended end of said frame so its weight will have a tendency to cause said tractor to nose downward and apply the weight to said tread wheels, a driving connection between said engine and drive wheels, portable endless track chains on which said tread and drive wheels travel, and carrier wheels adjustably mounted on the forward ends of said rocking levers for normally carrying the forward end portions of said endless track chains out of contact with the ground.

6. A tractor having a frame, a draw bar connected thereto, a pair of drive wheels supporting the rear end of said frame, internal gears secured to said wheels, tread wheels supporting the front end of said frame so it is in a suspended position, an engine mounted on the suspended end of said frame so its weight will have a tendency to resist a pull on said draw bar, pinions in mesh with said internal gears that are arranged to move in an arc with said frame, and a driving connection between said pinions and engine.

GEORGE J. ZIEGLER.